United States Patent [19]

Winkelbauer et al.

[11] Patent Number: 5,360,773
[45] Date of Patent: Nov. 1, 1994

[54] HIGH DENSITY FUSED SILICA MIXES, REFRACTORY SHAPES MADE THEREFROM, AND METHOD OF MAKING THE SAME

[75] Inventors: Howard M. Winkelbauer, Boston, Pa.; Harold F. Gallman, Cartersville, Ga.

[73] Assignee: Indresco Inc., Dallas, Tex.

[21] Appl. No.: 98,468

[22] Filed: Jul. 28, 1993

[51] Int. Cl.$^5$ ................................. C04B 35/16
[52] U.S. Cl. ........................ 501/133; 501/154
[58] Field of Search ........................ 501/133, 154

[56] References Cited

U.S. PATENT DOCUMENTS

| | | | |
|---|---|---|---|
| 1,239,273 | 9/1917 | Hurt | 501/133 |
| 2,446,957 | 8/1948 | Conley | 501/133 |
| 3,144,345 | 8/1964 | McCreight et al. | 501/133 |
| 3,207,612 | 9/1965 | Martin | 501/133 |
| 3,236,665 | 2/1966 | King | 501/133 |
| 3,314,758 | 3/1967 | Scott | 501/133 X |
| 3,436,236 | 4/1969 | Gamber et al. | 501/133 X |
| 3,463,650 | 8/1969 | McCreight et al. | 501/133 |
| 3,684,538 | 8/1972 | Wright | 501/133 |
| 3,770,867 | 11/1973 | Criss | 264/294 |
| 3,943,216 | 3/1976 | Bakker | 264/56 |
| 4,221,596 | 9/1980 | Rice | 501/128 |
| 4,307,197 | 12/1981 | Daniel et al. | 501/100 |
| 4,623,393 | 11/1986 | Toda et al. | 106/38.22 |
| 4,988,649 | 1/1991 | Santowski et al. | 501/133 |
| 5,096,865 | 3/1992 | Dunworth | 501/133 |
| 5,147,834 | 9/1992 | Banerjee | 501/128 |

FOREIGN PATENT DOCUMENTS 004499  4/1964  Japan .
196021  4/1923  United Kingdom .

*Primary Examiner*—Karl Group
*Assistant Examiner*—David Sample
*Attorney, Agent, or Firm*—John L. Sigalos

[57] ABSTRACT

A refractory mix for forming a fused silica based refractory shape consisting essentially of a high purity fused silica and a binder system consisting essentially of a high purity colloidal silica solution and a high purity ammonium lignosulfonate. The invention also comprises fused silica based refractory shapes formed from such mix by pressing and firing.

11 Claims, No Drawings

HIGH DENSITY FUSED SILICA MIXES, REFRACTORY SHAPES MADE THEREFROM, AND METHOD OF MAKING THE SAME

BACKGROUND OF THE INVENTION

The present invention relates to high density fused silica mixes that can be formed by impact presses into high density refractory shapes.

Fused silica refractories are mainly used in industrial processes where temperatures generally do not exceed 2000° F. and/or the refractory is exposed to severe thermal cycling. Fused silica refractories are also used in acidic environments which generally operate at elevated temperatures. Examples of fused silica application areas are coke ovens, chlorinators, ceramic kilns, molten metal shrouds, and the like.

Up to the present it has not been possible to make pressed fused silica shapes such as brick, plates, or the like, having acceptable densities and strengths by power pressing. As a consequence it has been necessary to utilize slip casting to make fused silica shapes having densities from 117 to 122 pcf. Such density and also high strengths are required since such shapes are used in areas such a chlorinators and other application where low porosity, low permeability, and acid resistance are of paramount importance.

While slip casting is generally satisfactory to make fused silica shapes, it is a costly process by virtue of the long processing time and low production rates. More particularly, forming shapes by the slip method requires long residence times in plaster molds and long drying times before the shape can be fired. As a result the production costs for making shapes such as brick or plates by slip casting is much higher than utilizing power pressing techniques commonly used in forming brick.

The reason for the long drying times is obvious since in order to be utilized in a slip, as opposed to being power pressed, for any given formulation there is at least about four times more water in a slip to be used as opposed to a composition that is to be power pressed.

Efforts to try to use a press to form a silica brick of high amorphous content is set forth in the McCreight et al Patent, U.S. Pat. No. 3,463,650 in which vitreous silica grain made according to the teachings of U.S. Pat. No. 3,314,758 was used in a brick mix. This mix contained fumed silica and impure binders which caused devitrification (formation of crystalline phases) of amorphous silica. These bricks were characterized by a bulk density of 115–116 psi and a strength of 700–800 psi as measured by room temperature modulus of rupture. Although this patent shows that brick could be made in the laboratory with an amorphous content of 95%, in reality, brick fired in production quantities required a longer hold time for the mass to reach equilibrium and amorphous contents of 80 to 90% were more typical. These brick had inferior thermal shock resistance compared to 100% amorphous silica and at times the strengths are less than 700 psi.

For a long time it has been desired to produce a fused silica brick by power pressing which has more than 90% amorphous content, a density near or above 120 pcf, and a strength over 1000 psi.

Thus, the McCreight patent which issued some twenty-four years ago showed an effort to try to eliminate slip casting which has not been successful and the more recent Dunworth Patent No. 5,096,865 shows the continued use of slip casting in order to form high density fused silica shapes.

SUMMARY OF THE INVENTION

The present invention overcomes the problems of the prior art and results in high density fused silica shapes which can be formed by power pressing.

More particularly, the present invention comprises a refractory mix for forming a high density fused silica refractory shape consisting essentially of a high purity fused silica and a binder consisting essentially of a high purity collodial silica and a high purity ammonium lignosulfonate.

The present invention also comprises a fused silica refractory shape consisting essentially of a high purity fused silica bonded with high purity collodial silica and high purity ammonium lignosulfonate.

The present invention further comprises the method of making a fused silica refractory shape having low porosity comprising forming a mix consisting essentially of a high purity fused silica and a binder consisting essentially of a high purity collodial silica and ammonium lignosulfonate, pressing the mix to the shape desired, and then firing the pressed shape.

DETAILED DESCRIPTION

While the instant invention is applicable broadly to any fused silica refractory shape, such as blocks, plates, brick, and the like, it will be discussed in detail herein with respect to brick.

An essential criterion of the present invention is the use of a high purity fused silica ($SiO_2$). As used herein the term "high purity" means at least 98 wt. %, preferably 99.5 wt. % silica, most preferably 99.5 wt. % and higher.

Moreover, as is conventional in brick making, it is preferred to use a fused silica particle size distribution from about −4 to −325 mesh (Tyler standard).

The remaining essential component of the mix is the bonding system and this consists of high purity collodial silica solution and a high purity ammonium lignosulfonate. The colloidal silica solution should have a solids content of 30 to 50 wt.%. The purity level of the solution should be 99+wt. % silica plus aqueous vehicle. The viscosity of the solution should be less than 30 centipoise at room temperature. The pH of the solution is not critical with solutions having Low and high pH being equally effective.

As to the high purity ammonium lignosulfonate it is preferred that it have an ash content of less than about 3 wt.%, preferably less than about 2 wt. %, and contain less than about 0.25 wt. % calcium in the ash.

It is preferred not to utilize any other constituents in the mix and in the resultant finished products.

The brick can be formed from the mix simply by admixing the fused silica and the bonding system, forming the desired brick shape with a conventional impact press, and then firing the brick. The brick is preferably fired at high temperatures, i.e., about 2100° to 2200° F. with a hold time sufficient for the mass to reach thermal equilibrium, but not for such extended time that the brick devitrify to more than 10% crystalline silica, as measured by quantitative x-ray diffraction. For a conventional kiln load of pressed brick a sufficient hold time will probably range between 5 to 10 hrs. Only routine experimentation is needed to obtain the optimum balance between hold time and obtaining the desired set physical properties since each kiln will vary somewhat in its ability to fire a given load of brick because of differences in heating sources, design and the like. The result is a fused silica brick with a density of above 120 pcf with a porosity of about 9 to 12% and having a room temperature modulus of rupture above 1000 psi.

With respect to proportions, the bonding system is a plus addition to the silica refractory and is added in an amount of about 3 to 8 wt.% correspondingly 97 to 92 wt. % the fused silica. With respect to the components of the binder system itself while equal parts by weight of each can be utilized, it is preferred to use about 3 parts by wt. of the collodial silica to 2.5 parts by wt. of the ammonium lignosulfonate.

The invention will be further described in connection with the following examples which are set forth for purposes of illustration only.

EXAMPLES 1 to 4

A series of four mixes were prepared and brick formed therefrom on an impact press. The resultant brick were then tested for bulk density, strength, and porosity. The mix formulation, brick-forming conditions, and test results are set forth in Table I below. In addition the brick were compared to two commercial silica brick mixes, VISIL brand vitreous silica brick (a pressed composition) and MASROCK brand fused silica brick prepared by slip casting.

TABLE I

|  | Example No. | | | | VISIL | MASROCK |
|---|---|---|---|---|---|---|
|  | 1 | 2 | 3 | 4 | | |
| Fused Silica, 4/10 mesh | | 30% | | | | |
| Fused Silica, 10/20 | | 20% | | | | |
| Fused Silica, 20/50 | | 15% | | | | |
| Fused Silica, 50/100 | | 5% | | | | |
| Fused Silica, −325 | | 30% | | | | |
| Plus Additions | | | | | | |
| Colloidal Silica* | 3.0 | — | 1.1 | — | | |
| Colloidal Silica** | — | 3.0 | — | — | | |
| Ammonium lignosulfonate (51% solids) | 2.5 | 2.5 | — | 5.5 | | |
| Stearic Acid Flakes | — | — | 3.0 | — | | |
| Water (Deionized) | — | — | 1.9 | — | | |
| Brick Size | | 9 × 4.5 × 3.0″ | | | | |
| Impact Time, Sec. | 20 | 25 | 25 | 35 | | |
| Bulk Density at Press, pcf | 124 | 124 | 117 | 125 | | |
| Bulk Density After Drying, pcf | 121 | 121 | 113 | 121 | | |
| Properties After Firing to 2050° F. | | | | | | |
| Linear Change | −0.2 | 0.0 | −0.2 | — | | |
| Modulus of Rupture, psi on Whole Brick | 1280 | — | (1) | — | 915 | 2580 |
| Bulk Density, pcf | 119 | — | — | — | 118 | 122 |
| Apparent Porosity, % | 12.7 | — | — | — | 14.3 | 12.4 |
| Apparent Specific Gravity | 2.19 | — | — | — | 2.21 | 2.20 |
| Properties After Firing to 2100° F. | | | | | | |
| % Linear Change | −0.3 | — | — | | | |
| Modulus of Rupture, psi on Whole Brick | 1560 | — | — | | | |
| Bulk Density, pcf | 119 | — | — | | | |
| Apparent Porosity, % | 12.6 | — | — | | | |
| Apparent Specific Gravity | 2.19 | — | — | | | |
| Properties After Firing to 2150° F. | | | | | | |
| % Linear Change | — | — | −0.1 | | | |
| Modulus of Rupture, psi on Whole Brick | 1250 | — | 600 | | 915 | 2580 |
| Bulk Density, pcf | 121 | — | 119 | | 118 | 122 |
| Apparent Porosity, % | 11.7 | — | 12.9 | | 14.3 | 12.4 |
| Apparent Specific Gravity | 2.20 | — | 2.18 | | 2.21 | 2.20 |
| Properties After Firing to 2175° F. | | | | | | |
| % Linear Change | −0.3 | — | — | | | |
| Modulus of Rupture, psi On Whole Brick | 1730 | — | — | | | |
| Bulk Density, pcf | 122 | — | — | | | |
| Apparent Porosity, % | 10.7 | — | — | | | |
| Apparent Specific Gravity | 2.19 | — | — | | | |
| Cold Crushing Strength, psi on 2 × 2 × 3″ Cubes: | 7150 | — | — | | 5390 | 9730 |
| Air Permeability, centidarcys | 0.5 | — | — | | 0.6 | — |
| X-ray Diffraction Analysis | | | | | | |
| % Quartz | <1 | — | — | | 8 | tr |
| % Cristobalite | <1 | — | — | | 5 | <1 |
| % Amorphous (by difference) | 99+ | — | — | | 87 | 99+ |
| Properties After Firing to 2200° F. | | | | | | |

TABLE I-continued

| | Example No. | | | | VISIL | MASROCK |
|---|---|---|---|---|---|---|
| | 1 | 2 | 3 | 4 | | |
| % Linear Change | −0.6 | −0.33 | — | | | |
| Modulus of Rupture, psi | 1900 | 1870 | — | | 915 | 2580 |
| Bulk Density, pcf | 122 | 123 | — | | 118 | 122 |
| Apparent Porosity, % | 9.9 | 9.6 | — | | 14.3 | 12.4 |
| Apparent Specific Gravity | 2.18 | 2.17 | — | | 2.21 | 2.10 |
| X-ray Diffraction Analysis | | | | | | |
| % Quartz | <1 | <1 | — | | 8 | tr |
| % Cristobalite | 4 | 2 | — | | 5 | <1 |
| % Amorphous (by difference) | 96 | 98 | — | | 87 | 99+ |

*pH 3
**pH 9
(1) Because this mix had such low density, no further tests were performed thereon.

The firing schedules were:
1. 2050° F. Burn 6 hr. hold
2. 2100° F. Burn 6 hr. hold
3. 2150° F. Burn 6 hr. hold
4. 2175° F. Burn 6 hr. hold
5. 2200° F. Burn 6 hr. hold Individual brick of Example 1 were burned at one of each of the five burns, that of Example 2 were burned only at 2200° F., and that of Example 4 were burned only at 2150° F.

Table 1 clearly shows that fused silica brick made with high purity fused silica grain and high purity binders could be made and fired to 2175° F. without detectable loss of their amorphous state. The low porosity of 10.7% and 99+% amorphous state was quite unexpected since it is well known that above 2000° F. amorphous silica has the tendency to devitrify and silica of high purity, 99+%, tends to be sluggish its ability to sinter.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A refractory mix for forming a fused silica based refractory shape consisting essentially of a about 92 to 97 wt. % fused silica containing at least about 98 % wt. % silica and about 3 to 8 wt. % of a binder system consisting essentially of high purity colloidal silica solution and a high purity ammonium lignsulfonate.

2. The mix of claim 1, wherein said fused silica is at least 99.5 wt. % silica, said colloidal silica solution has a solids content of 30 to 50 wt. % and is 99 wt. % silica plus aqueous vehicle, and said ammonium lignosulfonate contains less than about 3 wt. % ash and there is less than about 0.25 wt. % calcium in the ash.

3. The mix of claim 2, wherein said fused silica is at least 99.9 wt. % silica.

4. A fused silica-based refractory shape consisting essentially of the fired mix of claim 1 having a density above 120 pcf, a porosity of about 9 to 12%, and a room temperature modulus of rupture above about 1000 psi.

5. The refractory shape of claim 4, wherein in the mix said fused silica is at least 99.5 wt. % silica, said colloidal silica solution has a solids content of 30 to 50 wt. % and is 99+wt. % silica plus aqueous vehicle, and said ammonium lignosulfonate contains less than about 3 wt. % ash and there is less than about 0.25 wt. % calcium in the ash.

6. The refractory shape of claim 5, wherein said fused silica is at least 99.9 wt. % silica.

7. The refractory shape of claim 6, having a crystalline content of less than 10%, as measured by x-ray diffraction.

8. A method of making a fused silica based refractory shape having an apparent porosity of 9 to 12% and a modulus of rupture above 1,000 psi comprising pressing a mix consisting essentially about 92 to 97 wt. % of a high purity fused silica containing at least about 95 wt. % silica and about 3 to 8 wt. % of a binder system consisting essentially of a high purity colloidal silica solution and a high purity ammonium lignosulfonate to shape and firing the pressed shape to a temperature above 2,000° F.

9. The method of claim 8, wherein said fused silica is at least 99.5 wt. % silica, said colloidal silica solution has a solids content of 30 to 50 wt. % and is 99+wt. % silica plus aqueous vehicle, and said ammonium lignosulfonate contains less than about 3 wt. % ash and there is less than about 0.25 wt. % calcium in the ash.

10. The method of claim 9, wherein said fused silica is at least 99.9 wt. % silica.

11. The method of claim 10, wherein said firing is for a sufficient time to sinter the shape and not to devitrify the shape to more than 10% crystalline silica as measured by x-ray diffraction.

* * * * *